US010094982B2

(12) United States Patent
Austerlitz

(10) Patent No.: US 10,094,982 B2
(45) Date of Patent: Oct. 9, 2018

(54) PASSIVE OPTICAL CIRCUIT BREAKER HAVING PLURAL OPTICAL WAVEGUIDE PORTIONS WITH DIFFERENT TRANSMISSIVITIES

(71) Applicant: Parker-Hannifin Corporation, Cleveland, OH (US)

(72) Inventor: Howard Austerlitz, Stony Brook, NY (US)

(73) Assignee: PARKER-HANNIFIN CORPORATION, Cleveland, OH (US)

(*) Notice: Subject to any disclaimer, the term of this patent is extended or adjusted under 35 U.S.C. 154(b) by 215 days.

(21) Appl. No.: 15/063,817

(22) Filed: Mar. 8, 2016

(65) Prior Publication Data

US 2016/0266325 A1    Sep. 15, 2016

Related U.S. Application Data

(60) Provisional application No. 62/170,808, filed on Jun. 4, 2015, provisional application No. 62/131,449, filed on Mar. 11, 2015.

(51) Int. Cl.
*G02B 6/35* (2006.01)

(52) U.S. Cl.
CPC ................. *G02B 6/3552* (2013.01)

(58) Field of Classification Search
CPC .............. G02B 26/0866; G02B 6/0218; G02B 6/3576; G02B 6/3552; G02B 2006/12195; G02B 6/29344; G02B 6/14; H04J 14/021; H04J 14/02
USPC .................................................... 250/227.22
See application file for complete search history.

(56) References Cited

U.S. PATENT DOCUMENTS

| | | | |
|---|---|---|---|
| 4,204,742 A | * | 5/1980 | Johnson ............... G02B 6/3576 356/43 |
| 5,781,331 A | | 7/1998 | Carr et al. |
| 6,385,363 B1 | | 5/2002 | Rajic et al. |
| 6,428,173 B1 | | 8/2002 | Dhuler et al. |
| 6,587,612 B1 | | 7/2003 | Mitchell et al. |

(Continued)

FOREIGN PATENT DOCUMENTS

| | | |
|---|---|---|
| WO | 1989/002064 | 3/1989 |
| WO | 2003/058338 | 7/2003 |

OTHER PUBLICATIONS

Sun, Peng et al., "Submilliwatt Thermo-Optic Switches Using Free Standing Silicon-on-Insulator Strip Waveguides", Optics Express, vol. 18, Issue 9, pp. 8406-8411, 2010.

*Primary Examiner* — Que T Le
(74) *Attorney, Agent, or Firm* — Renner Otto Boisselle and Sklar

(57) ABSTRACT

A passive optical circuit breaker includes a substrate and an optical waveguide assembly arranged relative to the substrate. The optical waveguide assembly includes a first optical waveguide portion having a first low-loss portion and a first high-loss portion, and a second optical waveguide portion having a second low-loss portion. The first low-loss portion and the second low-loss portion define a first optical path through the optical waveguide assembly, and optical energy directed through the first high-loss portion exceeding a prescribed threshold causes the first optical waveguide portion to physically deflect relative to the second optical waveguide portion and interrupt the first optical path through the optical waveguide assembly.

21 Claims, 3 Drawing Sheets

(56) References Cited

U.S. PATENT DOCUMENTS

| | | |
|---|---|---|
| 8,478,087 B2 | 7/2013 | Farber et al. |
| 2005/0031253 A1 | 2/2005 | Ma et al. |
| 2011/0305413 A1* | 12/2011 | Heidrich .............. G02B 6/3508 385/2 |
| 2014/0166852 A1* | 6/2014 | Hauzeray .............. G01J 1/0228 250/205 |

* cited by examiner

PASSIVE OPTICAL CIRCUIT BREAKER HAVING PLURAL OPTICAL WAVEGUIDE PORTIONS WITH DIFFERENT TRANSMISSIVITIES

RELATED APPLICATION DATA

This application claims priority of U.S. Provisional Application No. 62/131,449 filed on Mar. 11, 2015 and U.S. Provisional Application No. 61/170,808 filed on Jun. 15, 2015, each of which is incorporated herein by reference in its entirety.

FIELD OF INVENTION

The present invention relates generally to optical devices and, more particularly, to optical circuit breakers for limiting the transmission of optical power.

BACKGROUND OF THE INVENTION

Aircraft fluid level gauging systems such as, for example, fuel tank level gauging systems, are transitioning from sensors embodied as capacitance-based probes to optically-based sensors. Use of optically-based sensors is advantageous, for example, in that they can reduce or eliminate electrically conductive materials in the fuel tank and therefore are safer than non-optically-based systems. Further, since no electrical wiring is needed inside the fuel tank optically-based sensors act as inherently intrinsically safe sensors.

While optically-based sensors reduce or eliminate electrically conductive materials in the fuel tank (and thus the electrical power transmitted by such materials), there is the potential for excessive optical power being injected into the fuel tank. To address this issue, optical switches are utilized that limit the transmission of optical power into the fuel tank.

SUMMARY OF THE INVENTION

A drawback to some conventional optical switches is that they do not completely interrupt the optical power. In other words, conventional optical switches used in aircraft fuel systems do not achieve a transmissivity of 0. As a result, some optical power may still make its way into the fuel tank even when the optical switch is in the "tripped" position. Other optical switches used in aircraft systems are active devices that require some electrical power to operate, which as noted above can be undesirable.

An optical circuit breaker in accordance with the present disclosure has significant advantages over the existing art. In particular, the optical circuit breaker in accordance with the present disclosure can completely attenuate optical power that exceeds a prescribed level, ensuring intrinsic safety when such optical power is present in a potentially explosive atmosphere. In addition, the optical circuit breaker in accordance with the present disclosure is a passive device that can operate using only the received light power. Thus, there is no need for electrically conductive materials. Further, the optical circuit breaker in accordance with the present disclosure does not rely on liquids, dyes or other materials that are prone to significant aging effects.

According to one aspect of the invention, a passive optical circuit breaker includes a substrate; and an optical waveguide assembly arranged relative to the substrate, the optical waveguide assembly including: i) a first optical waveguide portion having a first low-loss portion and a first high-loss portion, and ii) a second optical waveguide portion having a second low-loss portion, wherein the first low-loss portion and the second low-loss portion define a first optical path through the optical waveguide assembly, and optical energy directed through the first high-loss portion exceeding a prescribed threshold causes the first optical waveguide portion to physically deflect relative to the second optical waveguide portion and interrupt the first optical path through the optical waveguide assembly.

In one embodiment, the optical circuit breaker includes an air gap separating the first optical waveguide portion and the second optical waveguide portion.

In one embodiment, the first optical waveguide portion comprises a material with a higher thermal coefficient of expansion (TCE) than the second optical waveguide portion.

In one embodiment, the material having the higher TCE is bonded to the first optical waveguide portion.

In one embodiment, the material having the higher TCE comprises at least one of metal, elastomer, rubber or plastic.

In one embodiment, the substrate comprises glass.

In one embodiment, the optical waveguide assembly includes an optical input for receiving light and optical output for outputting light, the optical input optically coupled to the first optical waveguide portion and the optical output optically coupled to the second optical waveguide portion.

In one embodiment, the first optical waveguide includes an optical coupler arranged to provide at least a portion of light received at the optical input to the second waveguide portion.

In one embodiment, the optical input and the optical output comprise at least one of an optical fiber or an optical fiber interface.

In one embodiment, the optical circuit breaker comprises a micro-opto-mechanical system (MOMS) device.

In one embodiment, the first low-loss portion is optically coupled to the first high-loss portion.

In one embodiment, the first and second optical waveguide portions are integrally formed in the substrate.

In one embodiment, the first high-loss portion includes a material operative to absorb optical energy to produce heat.

In one embodiment, the optical circuit breaker includes a third optical waveguide portion, wherein the first optical waveguide portion and the third optical waveguide portion define a third optical path through the optical waveguide assembly, and wherein deflection of the first optical waveguide portion optically couples the third optical path through the optical waveguide assembly.

According to another aspect of the disclosure, an aircraft includes a fuel tank; an optical sensor arranged in the fuel tank; a light source; and the passive optical circuit breaker described herein, wherein the passive optical circuit breaker is arranged in series between the light source and the optical sensor to limit optical power provided to the optical sensor.

According to another aspect of the disclosure, a method for limiting optical power provided light generated by a light source includes: receiving the light at a first waveguide portion; communicating the received light to a second waveguide portion via a first optical path defined between the first waveguide portion and the second waveguide portion; and interrupting the first optical path based on heat generated by a portion of the received light.

In one embodiment, interrupting includes diverting a portion of the received light into a lossy waveguide to generate heat proportional to the received optical power.

In one embodiment, interrupting includes using the heat generated via the lossy waveguide to cause a portion of the first waveguide to move relative to the second waveguide thereby interrupting the first optical path.

In one embodiment, interrupting includes relying on different thermal coefficients of expansion along the first waveguide portion to cause bending of the first waveguide portion.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings

BRIEF DESCRIPTION OF THE DRAWINGS

Many aspects of the invention in accordance with the present disclosure can be better understood with reference to the following drawings. The components in the drawings are not necessarily to scale, emphasis instead being placed upon clearly illustrating the principles in accordance with the present disclosure. Likewise, elements and features depicted in one drawing may be combined with elements and features depicted in additional drawings. Additionally, in the drawings, like reference numerals designate corresponding parts throughout the several views.

DETAILED DESCRIPTION

Figure 1:
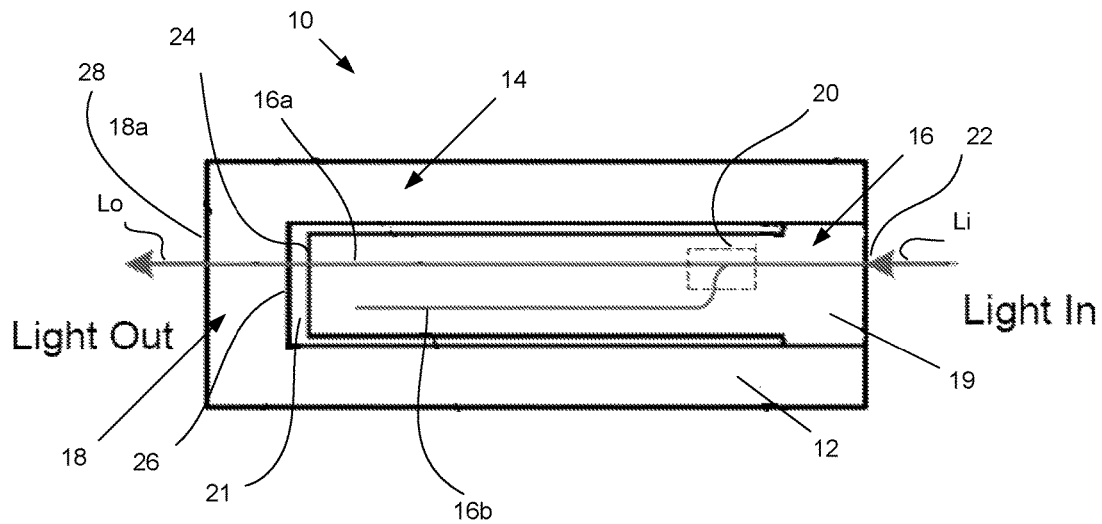
FIG. 1 is a top schematic view of an exemplary optical circuit breaker in accordance with the present disclosure.

The optical circuit breaker in accordance with the present disclosure has utility in aircraft fuel systems and therefore will be described chiefly in this context. It will be understood, however, that the optical circuit breaker in accordance with the present disclosure can be used with any optical system in which it is desired to passively limit the optical power in the system.

A passive optical circuit breaker in accordance with the present disclosure prevents high optical power levels from being provided to a device, such as an optical sensor or the like. The optical circuit breaker may be used in aircraft (or other) fuel systems that contain optical sensors and/or other optically powered devices (including optically powered electronics). For example, in an aircraft fuel tank, high-intensity light emitted from a broken fiber or a faulty optical device, such as a connector, could constitute a possible explosion hazard. The optical circuit breaker provides protection against such a fault condition.

The optical circuit breaker, which preferably is fabricated as a micro-opto-mechanical system (MOMS) device, includes a first, low-loss optical waveguide for receiving light from a light source and a second low-loss optical waveguide for outputting the received light, the first and second waveguides being separated by a small gap (e.g., an air gap). An optical coupler is also provided, the optical coupler operative to divert a fraction of the input optical power into a high-loss optical waveguide that converts the diverted optical energy into heat. The high-loss optical waveguide is fabricated in or otherwise attached to a bendable arm composed of or coated with a material possessing a much higher thermal coefficient of expansion (TCE) than other portions of the bendable arm.

In operation, as the optical amplitude exceeds a prescribed level heat is generated by the high-loss optical waveguide. The generated heat causes the portion of the bendable arm with the high TCE to expand at a much higher rate than the remaining portions, and this expansion causes the bendable arm to bend. As the arm bends an output of the first optical waveguide moves relative to an input of the second optical waveguide. As a result, the optical coupling between the output of the first optical waveguide and the input of the second optical waveguide is completely interrupted, thereby cutting off the transmission of optical power.

Thus, under normal (low-power) conditions the output of the first low-loss optical waveguide aligns with the input of the second low-loss optical waveguide across the air gap. This alignment enables light to pass through the optical circuit breaker with very little attenuation. However, if the optical power exceeds a prescribed threshold level (e.g., due to a faulty laser control circuit excess optical power is produced), the heat generated in the high-loss waveguide warms the bendable arm and, due to the high TCE section on a portion of the bendable arm, causes the bendable arm to move. The movement interrupts the light path between the first low-loss optical waveguide and the second low-loss optical waveguide, thereby preventing the high level of optical power from passing through the optical circuit breaker. When the optical power is reduced back to a safe level (e.g., below a reset level), the bendable arm cools and returns to its original position, thereby optically aligning the first and second low-loss optical waveguides and allowing light to pass through the optical circuit breaker. Thus, the optical circuit breaker is automatically reset, without needing any special intervention.

Figure 2:
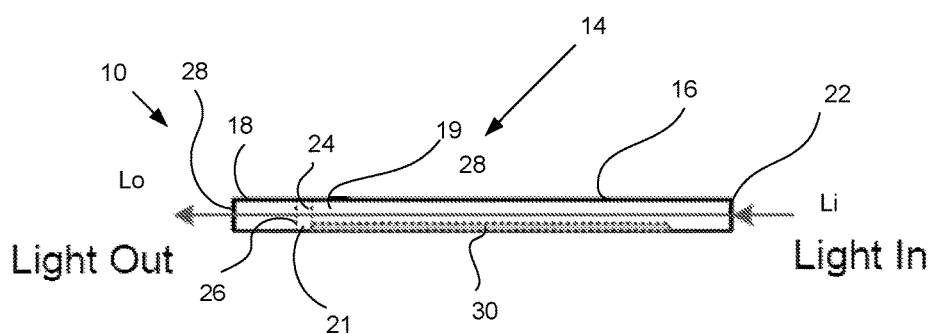
FIG. 2 is a side schematic view of the optical circuit breaker of FIG. 1 in the closed state.
Figure 3:
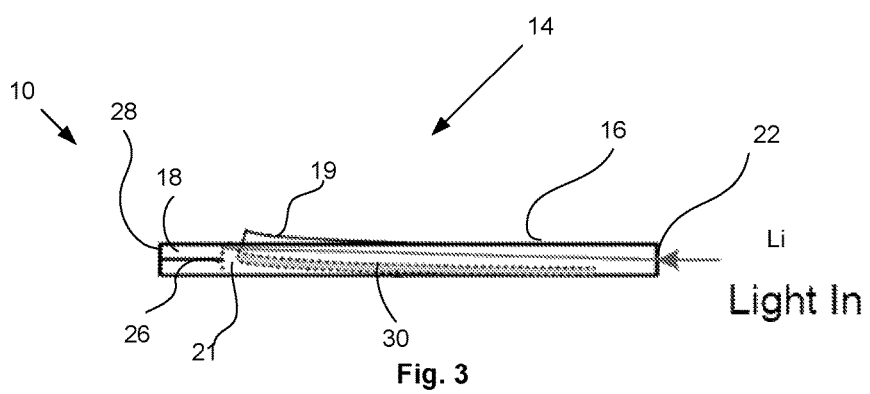
FIG. 3 is a side schematic view of the optical circuit breaker of FIG. 1 in the open state.

Referring now to FIGS. 1-3, illustrated is an exemplary optical circuit breaker 10 in accordance with the present disclosure. FIG. 1 is a top schematic view of the optical circuit breaker 10, while FIGS. 2 and 3 are side schematic views. FIG. 2 illustrates a closed state of the optical circuit breaker 10 that enables light to pass through uninterrupted, while FIG. 3 illustrates an open state of the optical circuit breaker 10 that prevents light from passing through the circuit breaker.

The exemplary optical circuit breaker 10 of FIGS. 1-3 is formed on a substrate 12, such as glass or any other suitable optically transparent material. An optical waveguide assembly 14 is arranged relative to the substrate 12, the optical waveguide assembly 14 including a first optical waveguide portion 16 and a second optical waveguide portion 18. The optical waveguide assembly 14 further includes a bendable arm 19, where the first optical waveguide portion 16 is arranged on the bendable arm 19. As will be further described below, movement of the bendable arm 19 (and thus the first optical waveguide portion 16) relative to the second optical waveguide portion 18 interrupts the passage of light through the optical circuit breaker 10.

The optical waveguide assembly 14 may be integrally formed with the substrate 12. For example, the optical waveguide assembly 14 may be etched in the substrate 12. Alternatively, the optical waveguide assembly 14 may be formed separate from the substrate 12 and attached thereto (e.g., the optical waveguide assembly 14 may be bonded to the substrate 12).

The first optical waveguide portion 16 includes a first low-loss portion 16a and a first high-loss portion 16b, while the second optical waveguide portion 18 includes a second low-loss portion 18a. Preferably, the first and second low-loss portions 16a and 18a have a transmissivity greater than 90%, and more preferably greater than 95%. Preferably, to maximize heating the first high-loss portion 16b has a transmissivity less than 50%.

The first optical waveguide portion 16 also includes a coupling means, such as an optical coupler 20 configured to couple both the first low-loss portion 16a and the first high-loss portion 16b to the same light input. In this regard, the optical coupler 20 provides a majority of light received at an optical input of the optical circuit breaker 10 to the low-loss portion 16a, and at least a portion of light received at the optical input of the optical circuit breaker 10 to the second waveguide portion 16b. The optical coupler 20 may be any conventional optical coupler known in the art.

The first and second low-loss portions 16a, 18a have a high transmissivity, such that substantially no attenuation takes place in the respective portions 16a and 18a. Conversely, the first high-loss portion 16b is lossy, i.e., it has a transmissivity substantially lower than the low-loss portions 16a and 18a, and thus light is attenuated therein. The first high-loss portion 16b includes light-to-heat generating material, such as a semiconductor or other non-reflective material that is operative to absorb optical energy to produce heat. For example, the first high loss portion 16b may include a surface having a dark color (e.g., black) and/or covered with a metal oxide material.

A gap 21 separates the first optical waveguide portion 16 and the second optical waveguide portion 18. The gap may be filed with air, fluid, or may include some other transparent material that enables relative movement between the first waveguide portion 16 and the second waveguide portion 18.

The first waveguide portion 16 includes a first (external) optical input 22 for receiving light $L_i$ from a light source (e.g., such as a laser light source or the like—not shown), and a first (internal) output 24 for outputting the received light within the optical circuit breaker 10. The second waveguide portion 18 includes a second (internal) input 26 for receiving light output by the first (internal) output 24, and a second (external) output 28 for outputting light $L_o$ received by the light source. The first optical input 22 and the second optical output 28 may comprise an optical fiber, an optical fiber interface, a ferrule, or any other means in which to connect an optical transmission line to the optical circuit breaker 10.

At least part of the first optical waveguide portion 16 (e.g., the bendable arm 19) includes a material 30 with a higher thermal coefficient of expansion (TCE) than other portions of the first waveguide portion 16. In one embodiment, the material 30 having the higher TCE is bonded to the bendable arm 19 and/or to the first optical waveguide portion 16, and may comprise at least one of metal, elastomer, rubber or plastic.

In operation, light $L_i$ is provided to the first input 22 of the optical circuit breaker 10 where it travels to the optical coupler 20. The optical coupler 20 provides a majority of the light to the first low-loss waveguide portion 16a, and a portion of the light to the first high-loss waveguide portion 16b.

The first high-loss portion 16b acts as a heater to determine when the breaker switches states. Light $L_i$ having optical power less than a prescribed threshold does not cause sufficient heat generation in the first high-loss waveguide portion 16b to cause significant expansion of the material 30. As a result, the bendable arm 19 does not deflect and the first low-loss portion 16a and the second low-loss portion 18a are optically aligned so as to define a first optical path through the optical waveguide assembly 14. In this regard, the respective inputs 22 and 26 and outputs 24 and 28 are optically coupled to one another and light can pass through the circuit breaker 10. However, light $L_i$ having optical power greater than a prescribed threshold will cause sufficient heat generation in the first high-loss waveguide portion 16b to cause significant expansion of the material 30 on one side of the bendable arm 19. As a result, the bendable arm 19 deflects and the first waveguide portion 16a is no longer optically aligned with the second waveguide portion 18a, thereby interrupting the first optical path through the optical circuit breaker 10.

Figure 4A:
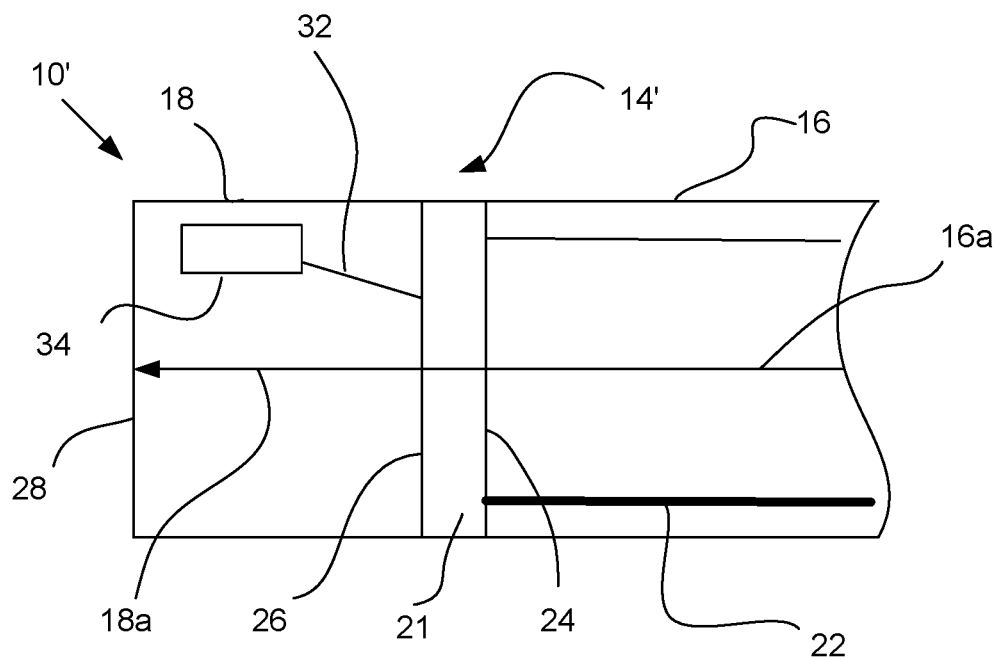
FIG. 4A is a partial side schematic view of another optical circuit breaker in accordance with the present disclosure shown in the closed state.
Figure 4B:
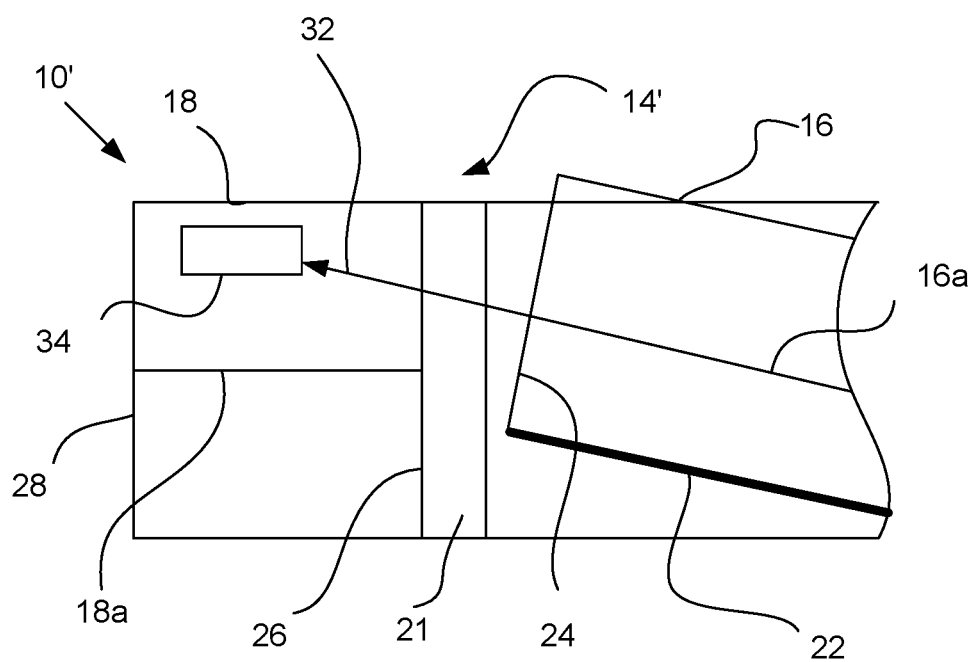
FIG. 4B is a partial side schematic view of the optical circuit breaker of FIG. 4A in the open state.

Referring to FIGS. 4A and 4B, which are partial side-views of an optical circuit breaker 10' in accordance with another embodiment of the present disclosure, illustrated is a waveguide assembly 14' that includes a third optical waveguide portion 32. The first optical waveguide portion 16 and the third optical waveguide portion 32 define a third optical path through the optical waveguide assembly 14', where deflection of the first optical waveguide portion 14 optically couples the third optical path. The third optical path can be used to determine when the circuit breaker 10' is in the tripped state. For example, an optical sensor 34 can be arranged in the third waveguide portion 32 to detect when light is directed thereon, which will occur only when the bendable arm 19 is in the state shown in FIG. 4B (i.e., the tripped state). The output of the optical sensor 34 then can be used to provide a status indication of the optical circuit breaker 10.

Figure 5:
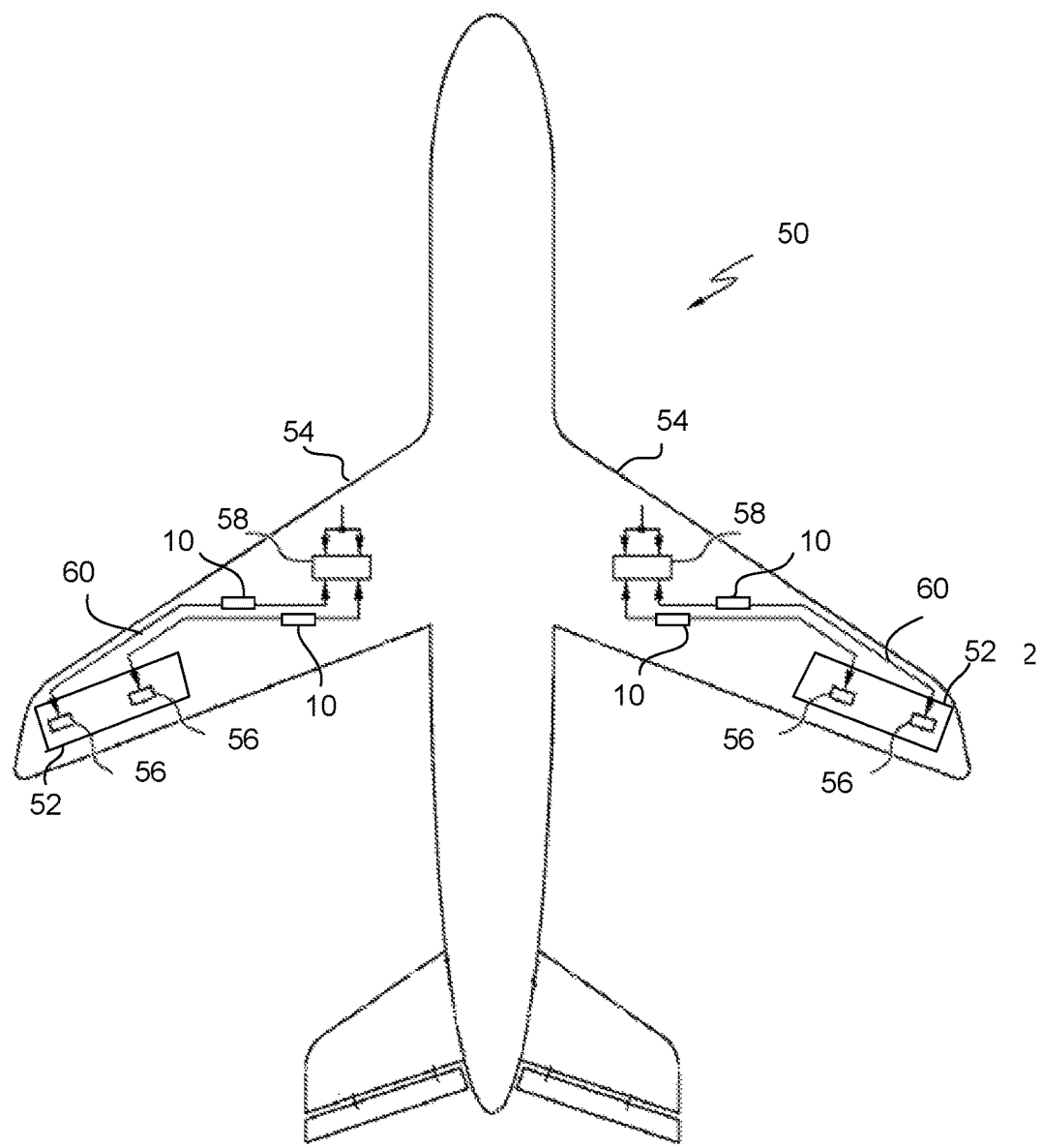
FIG. 5 is a simple schematic diagram of an aircraft that employs optical devices in a fuel tank of the aircraft.

Referring now to FIG. 5, illustrated is an exemplary aircraft 50 in which the optical circuit breaker 10, 10' in accordance with the present disclosure may be utilized. The aircraft 50 includes a plurality of fuel tanks 52 arranged within each wing 54, where each fuel tank 52 includes optical sensors 56, such as optical level sensors for determining a fuel level in the tanks 52. The sensors 56 are each connected to a respective controller 58 via a fiber-optic cable 60 or the like, each controller 58 configured to calculate a fuel level within each tank 52 based on data from the sensors 56. While the controllers 58 are shown in each wing 54, it is to be understood that the controllers may be located in other locations of the aircraft.

Optically in series between the controller 58 and a respective sensor 56 is an optical circuit breaker 10, 10' in accordance with the present disclosure. The optical circuit breaker 10, 10' limits the optical power provided to each sensor 56 as described herein (and thus the optical power provided into each fuel tank).

Advantageously, the optical circuit breaker 10, 10' in accordance with the present disclosure is a passive device and thus does not require any electrical connections. Moreover, the optical circuit breaker 10, 10' can completely interrupt the flow of optical power thereby ensuring the highest level of safety.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A passive optical circuit breaker, comprising:
   a substrate; and
   an optical waveguide assembly arranged relative to the substrate, the optical waveguide assembly including:
   i) a first optical waveguide portion having a first low-loss portion and a first high-loss portion, and
   ii) a second optical waveguide portion having a second low-loss portion,
   wherein the first low loss portion and the second low loss portion have a first transmissivity, and the first high-loss portion has a second transmissivity, the first transmissivity being greater than the second transmissivity, and
   wherein the first low-loss portion and the second low-loss portion define a first optical path through the optical waveguide assembly, and optical energy directed through the first high-loss portion exceeding a prescribed threshold causes the first optical waveguide portion to physically deflect relative to the second optical waveguide portion and interrupt the first optical path through the optical waveguide assembly.

2. The passive optical circuit breaker according to claim 1, further including an air gap separating the first optical waveguide portion and the second optical waveguide portion.

3. The passive optical circuit breaker according to claim 1, wherein the first optical waveguide portion comprises a material with a higher thermal coefficient of expansion (TCE) than the second optical waveguide portion.

4. The passive optical circuit breaker according to claim 3, wherein the material having the higher TCE is bonded to the first optical waveguide portion.

5. The passive optical circuit breaker according to claim 1, wherein the material having the higher TCE comprises at least one of metal, elastomer, rubber or plastic.

6. The passive optical circuit breaker according to claim 1, wherein the substrate comprises glass.

7. The passive optical circuit breaker according to claim 1, wherein optical waveguide assembly includes an optical input for receiving light and optical output for outputting light, the optical input optically coupled to the first optical waveguide portion and the optical output optically coupled to the second optical waveguide portion.

8. The passive optical circuit breaker according to claim 7, wherein the first optical waveguide portion includes an optical coupler arranged to provide at least a portion of light received at the optical input to the second waveguide portion.

9. The passive optical circuit breaker according to claim 1, wherein the optical input and the optical output comprise at least one of an optical fiber or an optical fiber interface.

10. The passive optical circuit breaker according to claim 1, wherein the optical circuit breaker comprises a micro-opto-mechanical system (MOMS) device.

11. The passive optical circuit breaker according to claim 1, wherein the first low-loss portion is optically coupled to the first high-loss portion.

12. The passive optical circuit breaker according to claim 1, wherein the first and second optical waveguide portions are integrally formed in the substrate.

13. The passive optical circuit breaker according to claim 1, wherein the first high-loss portion includes a material operative to absorb optical energy to produce heat.

14. The passive optical circuit breaker according to claim 1, further comprising a third optical waveguide portion, wherein the first optical waveguide portion and the third optical waveguide portion define a third optical path through the optical waveguide assembly, and wherein deflection of the first optical waveguide portion optically couples the third optical path through the optical waveguide assembly.

15. The passive optical circuit breaker according to claim 1, wherein upon optical energy directed through the first high-loss portion dropping below a reset threshold, the first optical waveguide portion optically aligns with the second low-loss portion to reset the passive optical circuit breaker.

16. An aircraft, comprising:
   a fuel tank;
   an optical sensor arranged in the fuel tank;
   a light source; and
   the passive optical circuit breaker according to claim 1, wherein the passive optical circuit breaker is arranged in series between the light source and the optical sensor to limit optical power provided to the optical sensor.

17. A method for limiting optical power provided light generated by a light source, comprising:
   receiving the light at a first waveguide portion having a first low-loss portion and a first high loss portion;
   communicating the received light to a second waveguide portion having a second low-loss portion via a first optical path defined between the first waveguide portion and the second waveguide portion, the first low-loss portion and the second low-loss portion having a first transmissivity and the first high-loss portion having a second transmissivity, the first transmissivity being greater than the second transmissivity; and
   interrupting the first optical path based on heat generated by a portion of the received light.

18. The method according to claim 17, wherein interrupting includes diverting a portion of the received light into a lossy waveguide to generate heat proportional to the received optical power.

19. The method according to claim 18, wherein interrupting includes using the heat generated via the lossy waveguide to cause a portion of the first waveguide to move relative to the second waveguide thereby interrupting the first optical path.

20. The method according to claim 19, wherein interrupting includes using a micro-opto-mechanical system (MOMS) device to cause movement of the first waveguide.

21. The method according to claim 17, wherein interrupting includes relying on different thermal coefficients of expansion along the first waveguide portion to cause bending of the first waveguide portion.

* * * * *